United States Patent
Sgroi, Jr. et al.

(10) Patent No.: US 9,377,041 B2
(45) Date of Patent: Jun. 28, 2016

(54) CONNECTING DEVICE

(71) Applicants: Anthony Sgroi, Jr., Wallingford, CT (US); Joseph K Patterson, Monroe, CT (US)

(72) Inventors: Anthony Sgroi, Jr., Wallingford, CT (US); Joseph K Patterson, Monroe, CT (US)

(*) Notice: Subject to any disclaimer, the term of this patent is extended or adjusted under 35 U.S.C. 154(b) by 296 days.

(21) Appl. No.: 14/168,021

(22) Filed: Jan. 30, 2014

(65) Prior Publication Data

US 2015/0104251 A1    Apr. 16, 2015

Related U.S. Application Data

(60) Provisional application No. 61/760,109, filed on Feb. 3, 2013.

(51) Int. Cl.
*F16B 7/18*    (2006.01)
*F16B 7/10*    (2006.01)

(52) U.S. Cl.
CPC ........... *F16B 7/105* (2013.01); *Y10T 403/7075* (2015.01)

(58) Field of Classification Search
CPC .... A63B 59/02; A63B 59/20; A63B 2012/14; F16B 7/105; F16B 7/182; Y10T 403/7084; Y10T 403/32491; Y10T 403/55; Y10T 403/5741; Y10T 403/32459
See application file for complete search history.

(56) References Cited

U.S. PATENT DOCUMENTS

| | | | | |
|---|---|---|---|---|
| 4,052,060 A * | 10/1977 | Balkcom | | A63B 49/035 473/531 |
| 6,916,259 B2 * | 7/2005 | Kohler | | A63B 59/20 473/513 |
| 7,282,000 B2 * | 10/2007 | Brine, III | | A63B 59/20 473/513 |
| 7,407,456 B2 * | 8/2008 | Price | | A63B 59/20 473/513 |
| 8,052,549 B2 * | 11/2011 | Sykora | | A63B 59/20 473/513 |
| 8,727,915 B2 * | 5/2014 | Lignelli | | A63B 60/10 473/513 |
| 2004/0063522 A1 * | 4/2004 | Wolf | | A63B 59/20 473/513 |
| 2013/0029792 A1 * | 1/2013 | Abdelmalek | | A63B 60/50 473/513 |
| 2014/0235377 A1 * | 8/2014 | Abdelmalek | | A63B 59/02 473/513 |
| 2016/0001149 A1 * | 1/2016 | Jenkins | | A63B 59/02 473/513 |

* cited by examiner

*Primary Examiner* — Joshua Kennedy
(74) *Attorney, Agent, or Firm* — Anthony Sgroi, Jr.

(57) ABSTRACT

A connecting device for connecting implements to poles is provided. In one example, the connecting device is configured to connect a lacrosse head to a pole. The pole comprises an elongated hollow cross section and has at least one hole located along a sidewall. Contained in the inner portion of the hollow cross section is the connecting device. The connecting device further comprises a fastening receiving portion substantially aligned to the hole located along the side wall of the pole for receiving a fastener. The lacrosse head contains a receiving portion complimentary in shape to fit on the pole and further includes a mounting hole. When the lacrosse head is assembled to the pole, the mounting hole on the lacrosse head is substantially aligned to the hole located on the side wall of the pole and the fastening receiving portion.

11 Claims, 15 Drawing Sheets

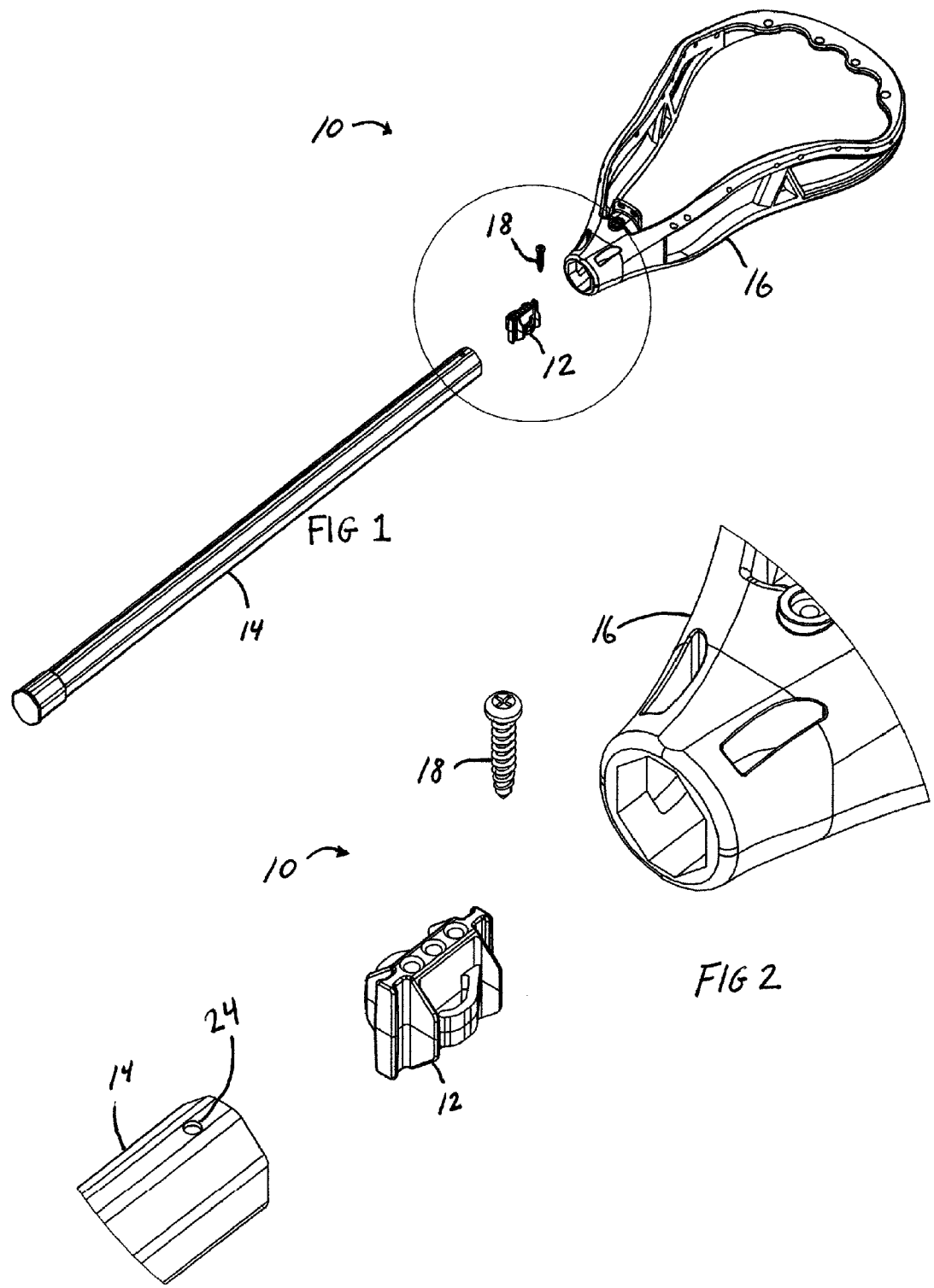

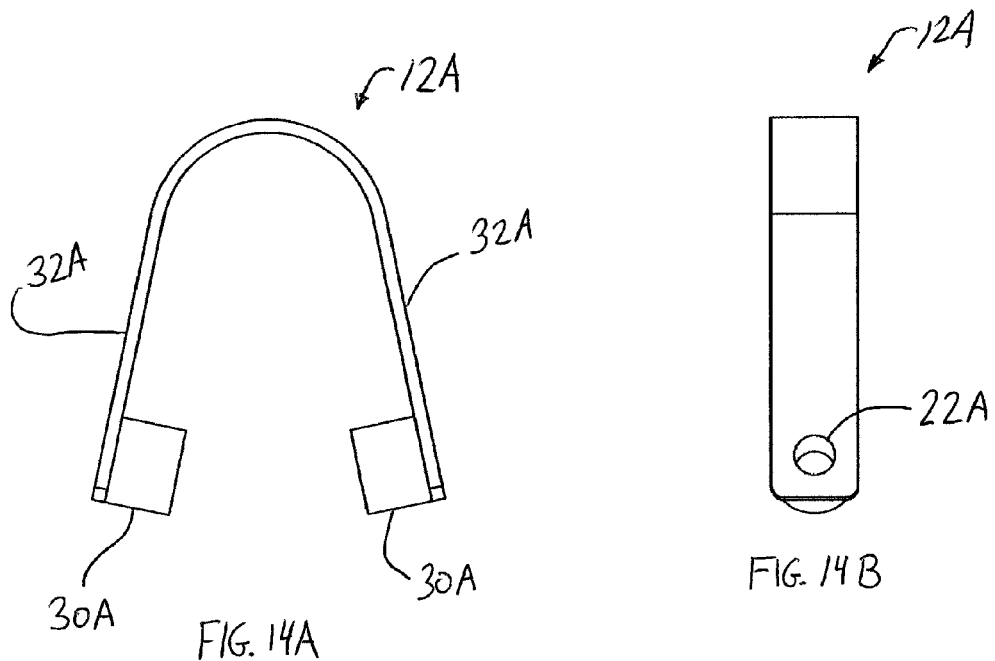
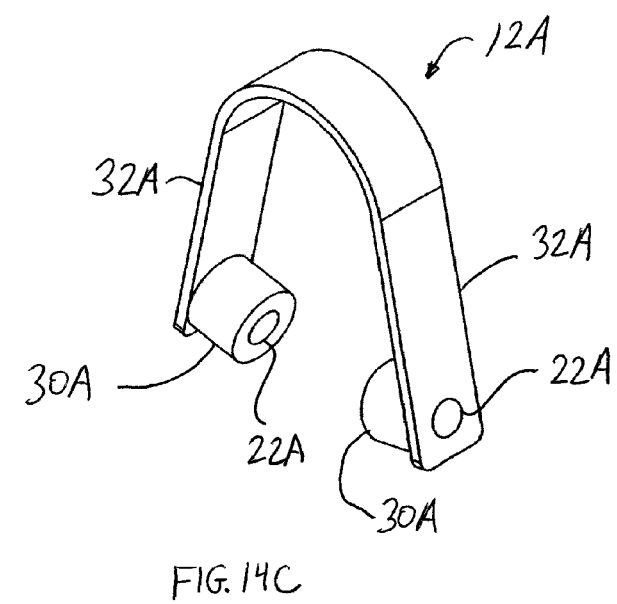

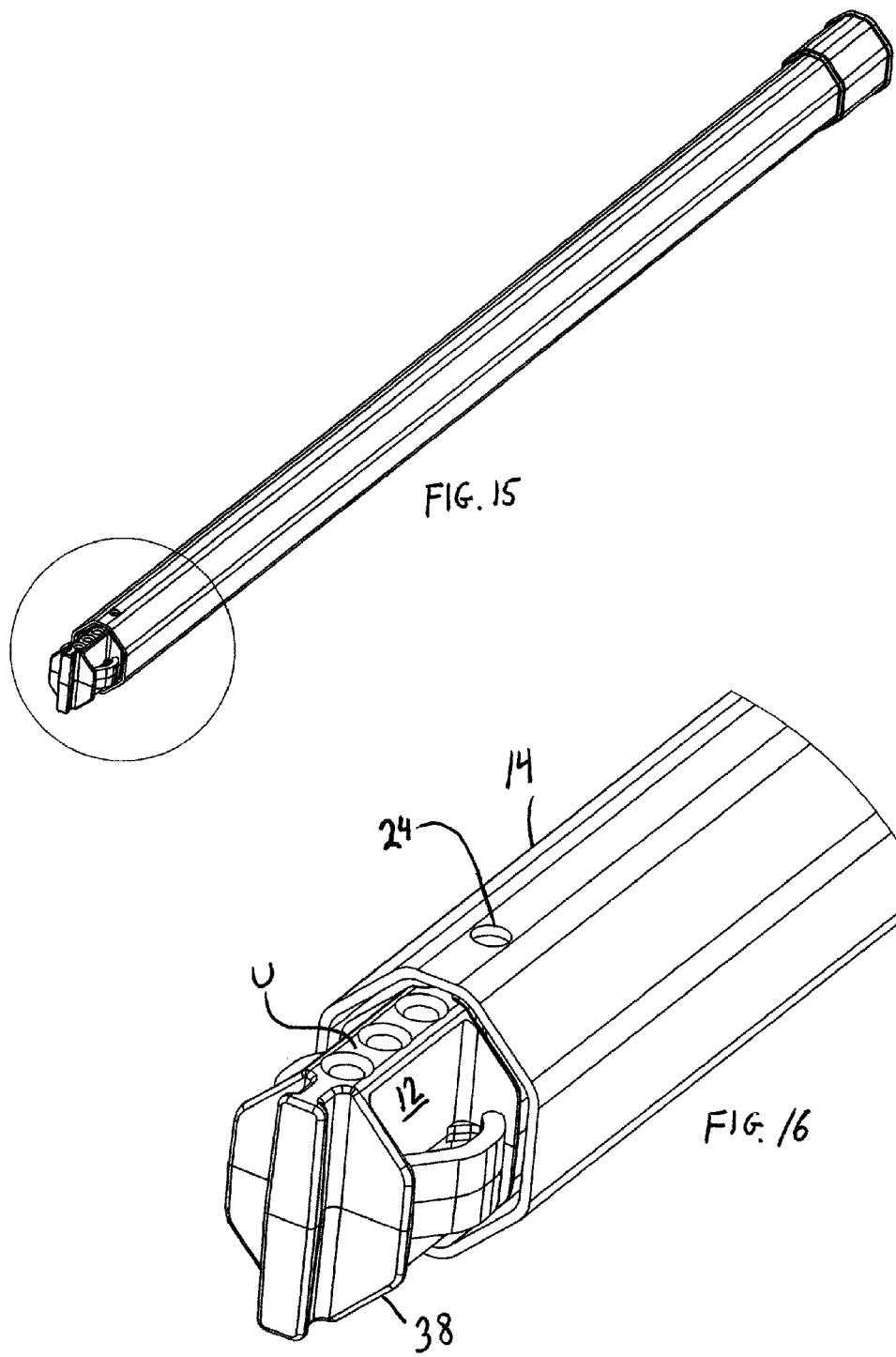

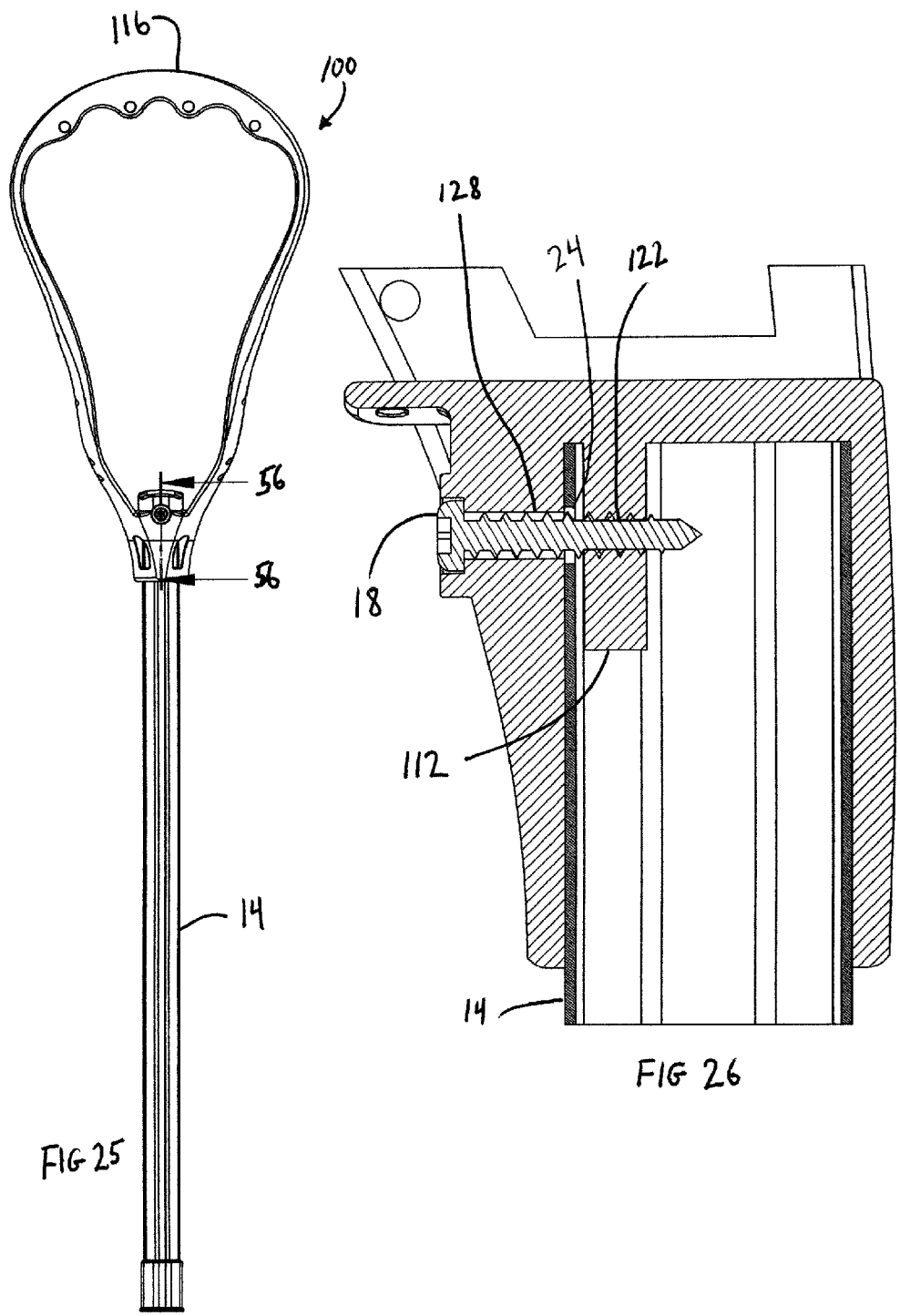

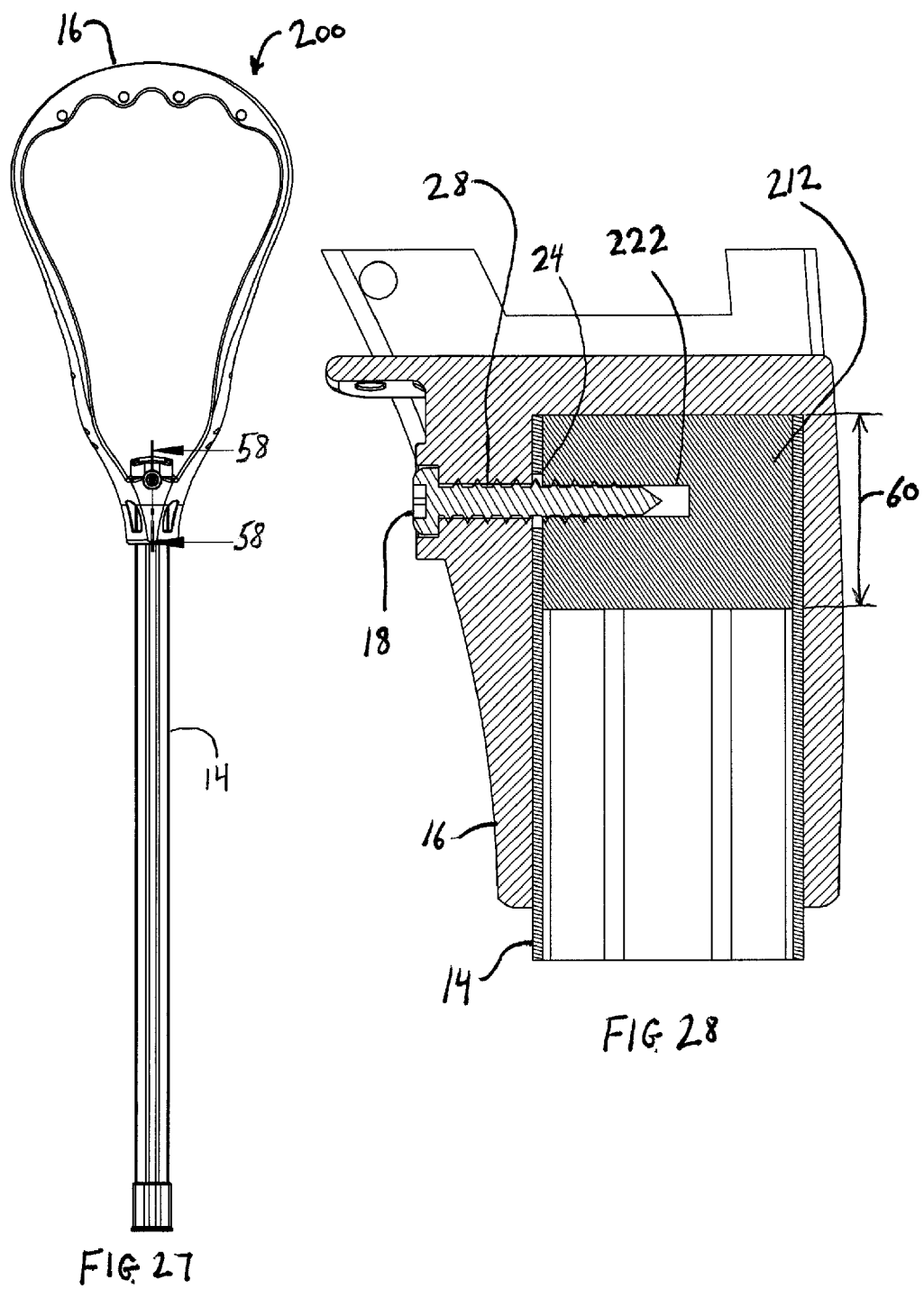

CONNECTING DEVICE

CROSS-REFERENCE TO RELATED APPLICATIONS

This application claims the benefit of U.S. Provisional Application Ser. No. 61/760,109 filed Jan. 3, 2013, the contents of which are incorporated by reference herein.

BACKGROUND OF THE INVENTION

1. Field of the Invention

The present disclosure is related to implements connected to poles. More particularly, the present disclosure is related to connecting devices that facilitate the connection of implements to poles. More specifically, the present disclosure is related to connecting devices that facilitate the connection of lacrosse heads to poles.

2. Description of Related Art

Poles are connected to various implements for use with certain rigorous activities. Such examples, among many possibilities, include tools (i.e. shovels, rakes, etc.) and sports activities. One such example of a sport activity that utilizes a pole to implement connection is the connection of a lacrosse head to a pole for the game of lacrosse. The pole is commonly fabricated using a hollow aluminum thin wall tube. The tube has a generally octagon shaped cross section and contains a hole through one of its side walls. The pole is inserted in a receiving portion (i.e. bore) of the lacrosse head where a complimentary hole located on the lacrosse head aligns to the hole of the aluminum pole after assembly. For a tight connection, a sheet metal screw is inserted through the hole of the lacrosse head and threaded into the hole on the aluminum pole for tightening. This maintains the assembly of the lacrosse head to the pole for use.

It has been observed that various implements can become loose during normal use. It has also been observed that various implements are required to be removed and reinstalled several times. Such removal and reinstallation can cause certain implements to become loose. This problem is very common with lacrosse heads. When lacrosse heads become loose, the user can become distracted when this condition occurs.

Therefore, there is a need for pole to implement connecting devices that overcome, alleviate, and/or mitigate one or more of the aforementioned and other deleterious effects of prior art pole to implement connections.

BRIEF SUMMARY OF THE INVENTION

The connection of a sheet metal screw to a thin wall tube has several drawbacks. First, this type of connection is dependent on a frictional connection. Such a frictional connection is created when the hole of the aluminum tube has a diameter smaller than the minor diameter of the sheet metal screw. When the sheet metal screw is aligned to the hole, a turning force allows for the threads to be force-threaded into the hole allowing for the screw to be twisted therethrough. This action forces the hole to deform via expansion and/or incremental separation. The result is an interference fit condition of the deformed aluminum hole surface to the minor diameter of the sheet metal screw and/or threads.

This interference fit relies solely on the integrity of the thin aluminum wall. This type of connection can degrade over time and causes unwanted loose lacrosse heads. For example, during rough play, the lacrosse stick can be hit several times during a game. This causes vibration and eventually contributes to the degradation of the interference fit. Vibration and shock causes incremental movement of the sheet metal screw resulting in wear and stress relaxation. The result is a loose sheet metal screw. Subsequent tightening is then required to maintain the connection. However, this creates only a temporary solution as the interference fit condition will again degrade over time. In order to mitigate the condition of unwanted loose lacrosse heads, a larger sheet metal screw can be typically utilized. Of course, the same condition occurs until it is impractical to increase the size of the sheet metal screw. At this time, users are forced to select an alternate location for the drilling of a new hole. Since many users may not have the necessary skill or equipment to drill an accurate hole, misalignment problems can occur further resulting in improper and/or loose lacrosse heads assembled to poles. In the extreme, the user would be forced to bear the cost of purchasing a new pole with a factory pre-drilled hole.

This condition is accelerated when the lacrosse head is removed for various reasons. For example, switching an alternate style lacrosse head onto an existing pole requires full removal and insertion of the sheet metal screw. During assembly and disassembly, the screw connection will degrade at a faster rate as compared to normal use due to excessive movement of the sheet metal screw.

Finally, this problem is more problematic when using nonmetallic poles. For nonmetallic poles such as composites (i.e. fiberglass), the hole in the shaft is fragile in comparison to the metallic shafts. This is due to the reduced elasticity of the material properties of composite materials as compared to metallic materials. For a hole size below the predetermined optimal, (i.e. too small), cracking can occur when a screw is threaded therethrough. In comparison, for a larger than optimal hole size, proper tightening and retention is not possible. The result for both conditions is the aforementioned unwanted loose lacrosse heads.

A connecting device for connecting implements to poles is provided. In one example, the connecting device is configured to connect a lacrosse head to a pole. The pole comprises an elongated hollow cross section and has at least one hole located along a sidewall. Contained in the inner portion of the hollow cross section is the connecting device. The connecting device further comprises a fastening receiving portion substantially aligned to the hole located along the side wall for receiving a fastener. The lacrosse head contains a receiving portion complimentary in shape to fit on the pole and further includes a mounting hole. When the lacrosse head is assembled to the pole, the mounting hole on the lacrosse head is substantially aligned to the hole located on the side wall of the pole and the fastening receiving portion.

In one example, the connecting device is insertable and contains an optional complimentary shape of the inner portion of the pole. The connecting device comprises an elongated body with one or more resilient arms extending therefrom. The arms are shaped to allow for flexing when the connecting device is inserted into the pole. The flexing provides sufficient force to maintain the selected position of the connecting device to the inner portion of the pole for assembly of the lacrosse head. The connecting device further comprises one or more fastening receiving portions. A selected one of one or more fastening receiving portions is pre-aligned to the hole on the pole. When the lacrosse head is assembled to the pole, a fastener is used to secure the lacrosse head to the pole. The fastener is inserted through the mounting hole of the lacrosse head, through the hole on the pole and secured to the fastening receiving portion of the connecting device. The constant use of a single fastening receiving portion can wear or degrade over time, thus by having a plurality of fastening receiving portions, alternates can be selectively chosen to increase the longevity of the product before repurchase is necessary.

The connecting device can be configured so that the user can utilize its function by multiple assembly options. In one example, the connecting device is assembled in a first orientation, the first orientation having a first end being inserted and an upper side facing up. In another example, the connecting device is inserted utilizing the second side with the upper side facing up. In yet another example, the connecting device is inserted utilizing the first side with the upper side facing down. In still another example, the connecting device is inserted utilizing the second side with the upper side facing down.

The connecting device further comprises a gripping portion located along each end. The gripping portion facilitates the removal of the connecting device. In the event that a user chooses to select an alternate fastening receiving portion, the gripping also facilities the movement of the connecting device to align to a alternate fastening receiving portion.

In order to facilitate flexing of the arms from multiple assembly options, the one or more arms include a first and second lead surface.

The connecting device can be made of any chosen material. In one example, the connecting device is form of injection molded thermoplastic. The fastening receiving portions of the connecting device can be arranged in multiple configurations that allows for the insertion of a fastener. In one example, the fastener is a thread forming screw and the fastening receiving portion is a hole molded therein. Such a self forming screw can also include the common sheet metal screw used for attaching the lacrosse head to the pole.

In another example, the connecting device is formed as part of the lacrosse head and has a fastening receiving portion located proximate to the mounting hole of the lacrosse head. In this configuration, the connecting device can be configured to be replaceable if desired.

The above-described and other features and advantages of the present disclosure will be appreciated and understood by those skilled in the art from the following detailed description, and drawings.

BRIEF DESCRIPTION OF THE SEVERAL VIEWS OF THE DRAWINGS

FIG. 1 is a perspective exploded view of a first exemplary embodiment of a device assembly utilizing the connecting device according to the present disclosure;

FIG. 2 is a detailed view taken from FIG. 1;

FIG. 14A through 14C illustrate an alternate configuration of the connecting device;

FIG. 15 illustrates the connecting device partially inserted inside the pole of the device assembly of FIG. 1;

FIG. 16 is a detailed view taken from FIG. 15;

FIGS. 25 through 26A illustrate perspective views of a second exemplary embodiment of a device assembly utilizing the connecting device according to the present disclosure; and FIGS. 27 and 28 illustrate perspective views of a third exemplary embodiment of a device assembly utilizing the connecting device according to the present disclosure.

DETAILED DESCRIPTION OF THE INVENTION

Figure 3:
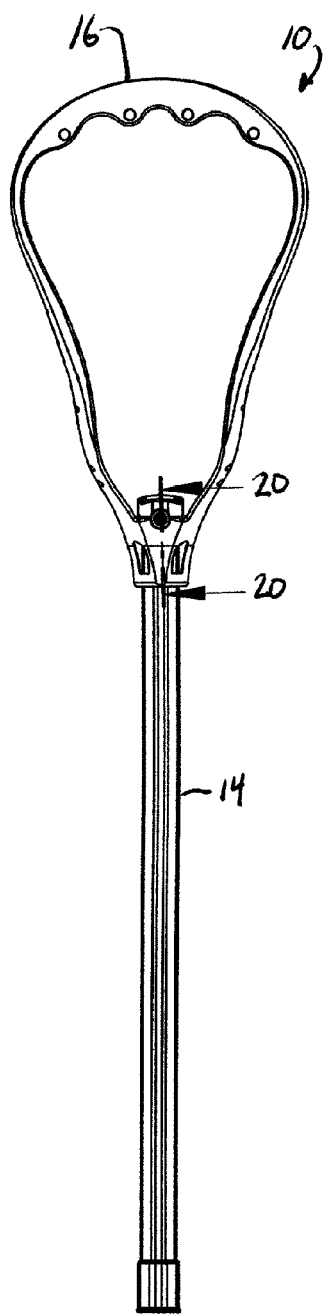
FIG. 3 is a front view of the device assembly of FIG. 1.

Referring to the drawings and in particular to FIGS. 1 through 6, a device assembly according to exemplary embodiments of the present disclosure is shown having reference numeral 10. Device assembly 10 includes a connecting device 12, a pole 14, an implement 16, and a fastener 18.

Figure 4:
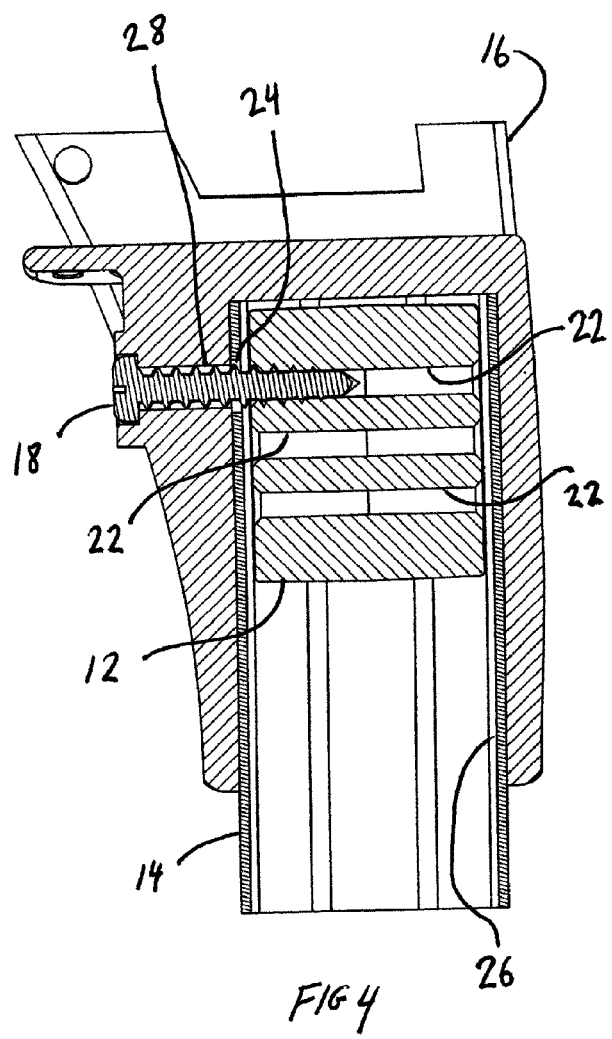
FIG. 4 is a cross-sectional view along line 20-20 taken from FIG. 3.
Figures 5, 6:
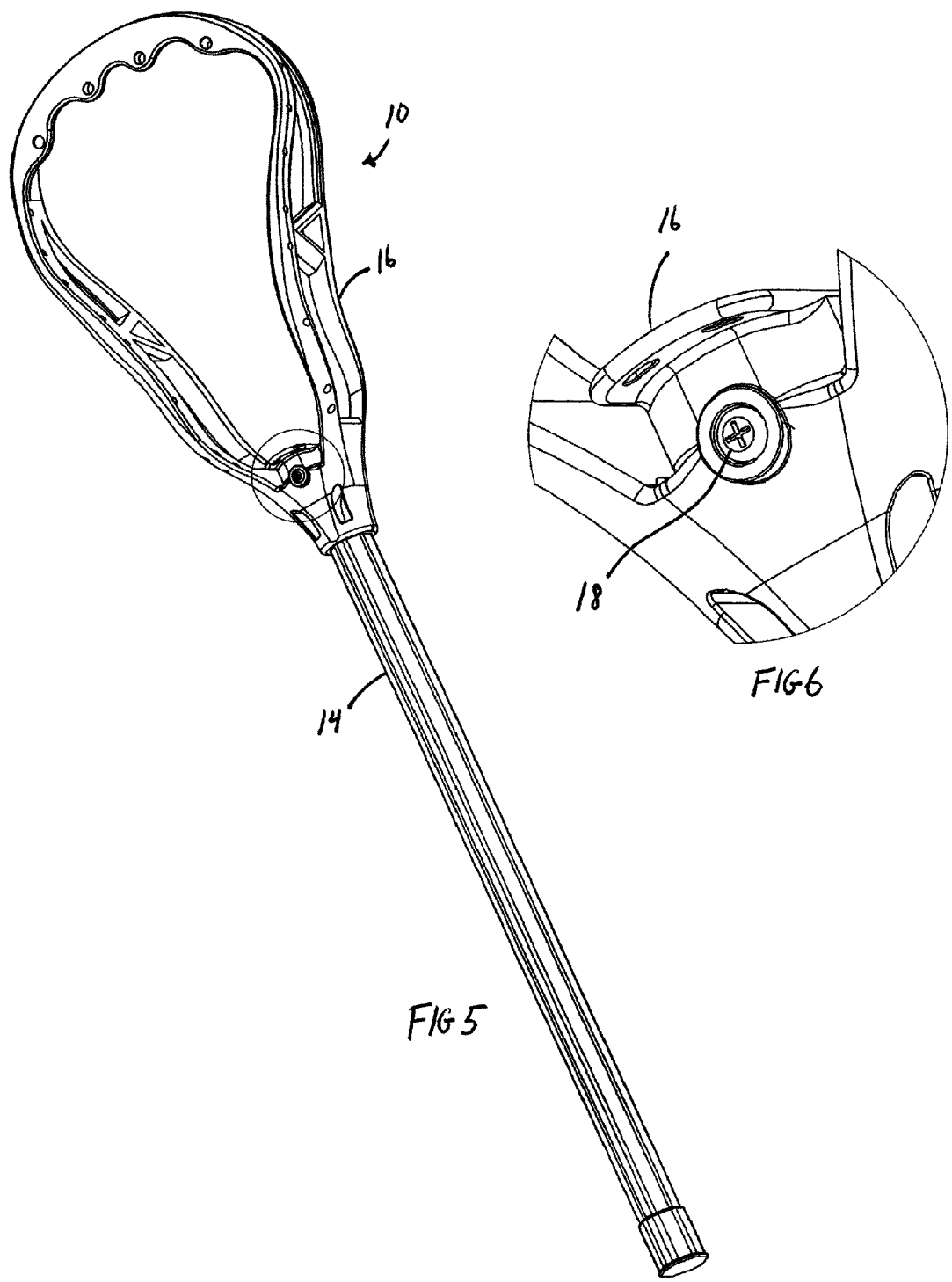
FIG. 5 illustrates the device assembly of FIG. 1 in an assemble state.
FIG. 6 is a detailed view taken from FIG. 5.
Figure 7:
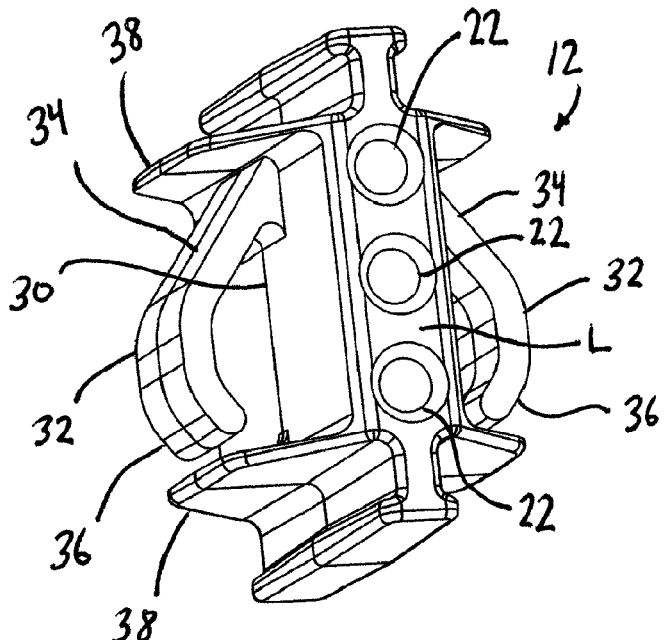
FIG. 7 is a perspective view illustrating a first orientation of the connecting device according to the present disclosure.
Figure 8:
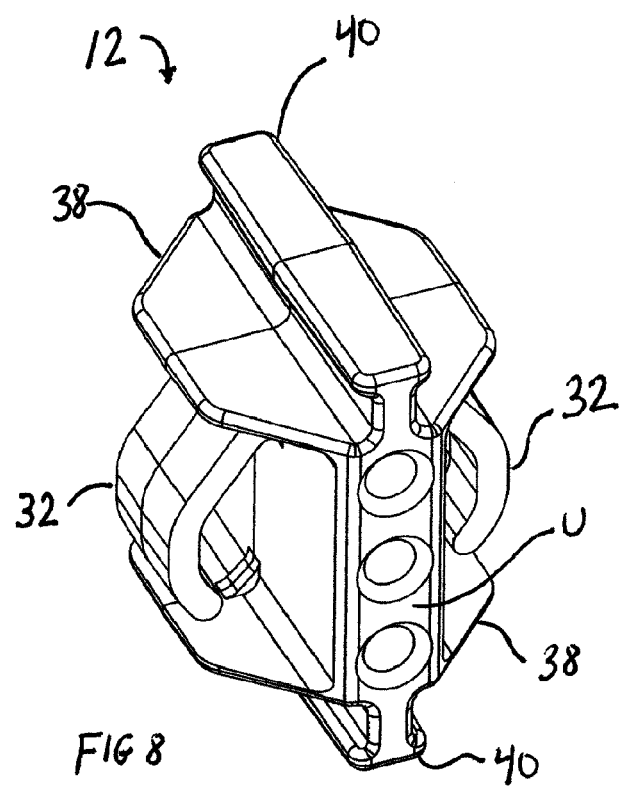
FIG. 8 is a perspective view illustrating a second orientation of the connecting device according to the present disclosure.
Figure 9:
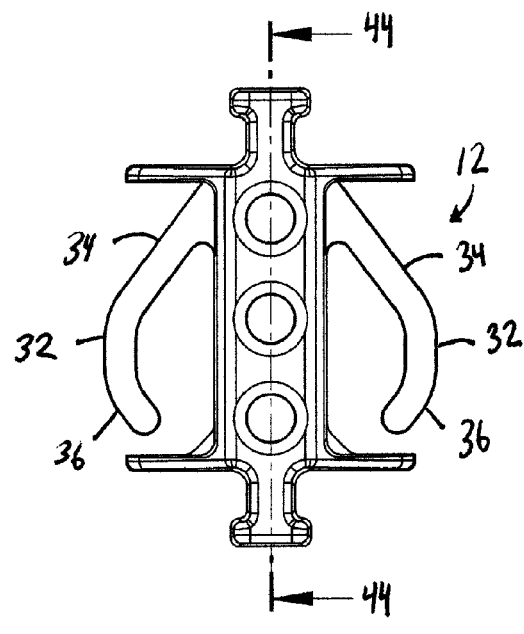
FIGS. 9 and 10 illustrate front and side vies of the connecting device of FIG. 7.
Figure 10:
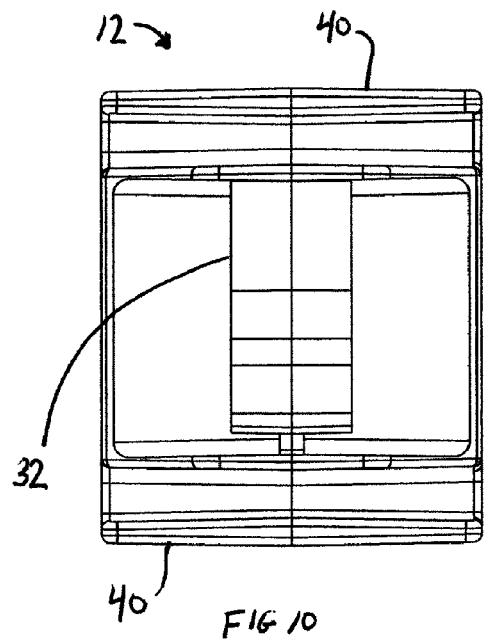
Figure 11:
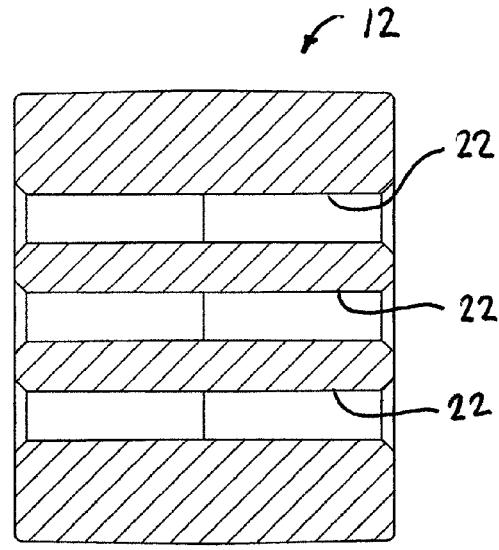
FIG. 11 is a cross-sectional view along line 44-44 taken from FIG. 9.
Figure 12:
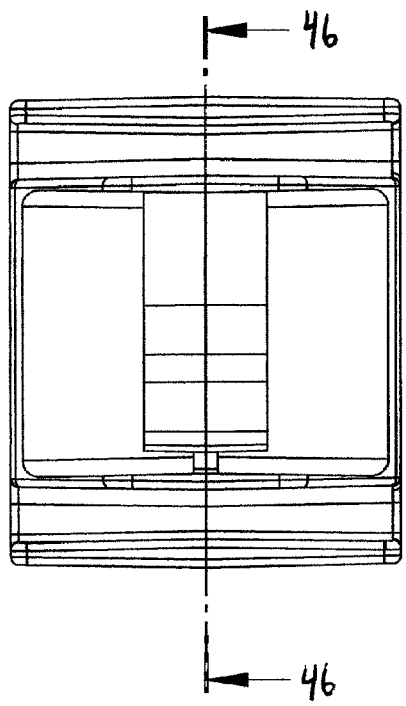
FIG. 12 is a second side view, opposite FIG. 10, of the connecting device of FIG. 7.

Advantageously, connecting device 12 is configured to insert into the interior of pole 14 so that implement 16 can be secured by fastener 18. As best seen in FIG. 4, connecting device 12 has one or more fastening receiving portions 22 which allows for the selective alignment to hole 24 located on pole 14. Once connecting device 12 is inserted into interior portion 26 of pole 14, connecting device 12 is resiliently maintained in the desired position. Thus, the user can align any chosen fastening receiving portion 22 of connecting device 12 to hole 24 of pole 14. The resilient insertion of connecting device 12 allows for the alignment of fastening receiving portion 22 to hole 24 to be maintained during the assembly of implement 16. As the assembly of implement 16 on pole 14 can be difficult at times, the resilient assembly of connecting device 12 to pole 14 maintains alignment of fastening receiving portion 22 to hole 24 during the assembly. Implement 16 is inserted until hole 28 on implement 16 is aligned to fastening receiving portion 22 and hole 24. This allows fastener 18 to be inserted into hole 28 of implement 16, through hole 24 of pole 14, and secured to connecting device 12 via fastening receiving portion 22.

The tightening of fastener 18 to connecting device 12 allows for a rigid or secure connection of implement 16 to pole 14. Such a secure connection is possible despite any tolerance of fit condition of implement 16 to pole 14. Thus, if implement 16 and pole 14 are toleranced for a loose connection, connecting device 12 allows for a secure connection without any movement (i.e. rattle) during use.

In the example provided, implement 16 is a lacrosse head and pole 14 is a pole typically used for the game of lacrosse. However it is contemplated by this disclosure that connecting device 12 can be used with any type of device assembly including and not limited to other various sporting equipment and tools such as shovels, rakes, etc, which require the use of a pole and implement.

Connecting device 12 is now described in detail by reference to FIGS. 7 through 14. Connecting device 12 has a body 30 and is elongated in this example. Body 30 comprises an upper surface U and a lower surface L. Extending from body 30 is a pair of arms 32. Arms 32 are symmetrical and are arranged in a cantilever format to allow for a resilient (springable) movement. Body 30 also contains a plurality of fastening receiving portions 22. In this example, three are shown; however any chosen quantity can be used if desired. In addition, a single fastening receiving portion 22 can be substituted for a plurality if desired. To facilitate misalignment of fastening receiving portions 22 to the hole 24 (FIG. 4), each fastening receiving portion 22 further includes an optional chamfer located on each side of fastening receiving portion 22.

To facilitate assembly, connecting device 12 further comprises an optional web 38 located on each end of connecting device 12. Web 38 is shaped in a complimentary manor to the interior portion 26 of pole 14 to signal the user as to the proper orientation for the proper insertion of connecting device 12 to pole 14. Such a signal produces an intuitive condition for the end user.

The intuitive nature of connective device 12 is further enhanced by the symmetrical design. By reference to FIG. 9, section line 44-44 defines the cross section in FIG. 11 and further defines a symmetrical center line for connecting device 12. Thus, each view taken from both sides of section line 44-44 of FIG. 9 would yield an identical view of connecting device 12. The same principle applies for the section line 46-46 shown in FIG. 12. The symmetrical nature of connecting device 12 in addition to the configuration of arms 32, will provide an intuitive mode of operation for the user as will be described in more detail below. Of course, it is contemplated by this disclosure that any shape including a non-symmetrical shape would still produce the desired operation as per the teachings of the present disclosure.

In the illustrated embodiment, pole 14 is a pole used for the game of lacrosse and has a substantially octagon shaped cross section. However, it is contemplated by this disclosure that connecting device 12 can be altered in shape to accommodate any shaped or sized pole cross section such as and not limited to round, elliptical, triangular, etc.

To facilitate the user, connecting device 12 further includes a gripping portion 40 located along each end. As will be detailed below, gripping portion 40 will provide multiple modes of operation for insertion and more importantly removal of connecting device 12.

In the example shown, connecting device 12 is a single component formed of an injection molded polymer material. Such material can include and is not limited to polyamide, polypropylene, where acetal is most preferred. Other materials fabricated by other processes are also possible. Such materials and process include and are not limited to cast urethane, machined plastics (thermoplastic and thermoset plastics), wood, etc. Other configurations are also possible. For example, connection device can be fabricated in multiple materials. Those having ordinary skill in the art can appreciate that connection device 12 can be fabricated in an aluminum body having one or more fastening receiving portions 22 with resilient spring steel arms 32 attached thereto. It is also contemplated by this disclosure that other substitutions for resilient arms 32 are possible. For example, compressible foam can be used in substitution for arms 32. In addition, flexible hollow tubes can also be used in substitution for arms 32. Those having ordinary skill in the art can appreciate the additional possibilities for the substitution of arms 32.

In the illustrated embodiment, fastening receiving portions 22 are through holes integrated along body 30. These holes are configured in size, in conjunction with the thermoplastic material properties, to accept various types of screws. Such screws include thread forming screws, thread cutting screws, self drilling screws, and sheet metal screws (a sheet metal screw through a plastic bore acts as a thread forming screw), among others. Advantageously, by utilizing these types of thread forming and sheetmetal screws in a hole formed of a plastic material, the tightened position of such screws is maintained during use. Of course it is also contemplated by this disclosure that alternate fastening options are possible. For example, fastening receiving portions 22 can utilize a threaded fastener such as but not limited to ultrasonic/heat staking inserts marketed under the tradename SI® sold by the company PEM® Pennengineering. In addition, those having ordinary skill in the art can also appreciate that a threaded nut can be bonded or overmolded to connecting device 12 to form a threaded connection.

It has also been determined by the present disclosure that arms 32 can have alternate shapes and located in different locations along body 30, but yet still provide the same function as per the teachings of this disclosure.

In yet another example, the principles of the connecting device can be also be provided according to FIGS. 14A through 14C. In this example, connecting device 12A is formed of a pair of arms 32A. Arms 32A are shaped in a substantially U-shaped configuration and has body 30A located along each end. Contained in each body 30A are fastening receiving portions 22A. Arms 30A is made of a spring steel material and form the springable movement properties as detailed above.

Figure 18:
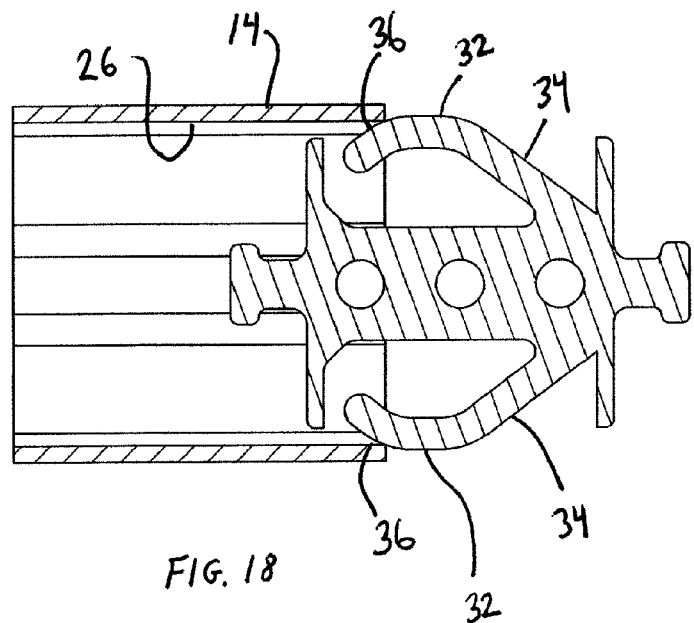

Operation of connecting device 12 is now described in detail by reference to FIGS. 15 through 24. Operation begins with the insertion of connecting device 12 into the interior portion of pole 14. As illustrated in FIGS. 15 and 16, connecting device 12 is shown in a partially inserted state with upper surface U facing up (in the same orientation of hole 24). Insertion continues with minimal effort as web 38 is shaped complimentary to the interior portion 26 of pole 14 with a predetermined clearance. Such a predetermined clearance allows for a smooth assembly of connecting device 12 until arms 38 contact (FIG. 18) the wall sections of pole 14. As shown in FIG. 18, second lead surfaces 36 of each arm 32 are in contact with the wall sections of pole 14. At this point, the user continues to insert (increase of insertion force) connection device 12 causing arms 32 to resiliently flex inward to allow passage of connecting device 12. This can be achieved by pressing gripping portion 40 by hand or with the assistance of any object such as the grip portion of a screwdriver. If desired, the user can facilitate the inward movement of arms 32 by pinching them inward. Once connecting device 12 is fully inserted inside interior portion 26 (FIG. 20) of pole 14, the user can select a fastening receiving portion (if more than one is present) 22 and align to the hole 24 located on pole 14.

The resilient nature of arms 32 provides sufficient force to maintain the position of connecting device 12 to the selected position for assembly of implement 16 to pole 14. Without wishing to be bound to a particular theory, the resilient force of arms 32 is sufficient to prevent unwanted movement of connecting device 12 during the assembly of implement 16 to pole 14 and yet still allow for selective removal of connecting device 12. The resilient force is configured to be sufficient enough to withstand pushing, light tapping, and any rapid movement of implement 16 as required for full assembly onto pole 14. This is necessary as depending on tolerance and/or deformed connection interfaces of implement 16 to pole 14, assembly may be difficult at times and require effort. Assembly is completed when hole 28 of implement 16 is aligned to the hole 24 of pole 14. Of course, hole 24 of pole 14 is already pre-aligned to one of selected fastening receiving portion 22. Once implement 16 is fully inserted onto pole 14, fastener 18 can be inserted into hole 28 of implement 16, through hole 24 of pole 14, and threaded into fastening receiving portion 22 of connecting device 12 for tightening. This can be seen by referring back to FIG. 4.

Figure 22:
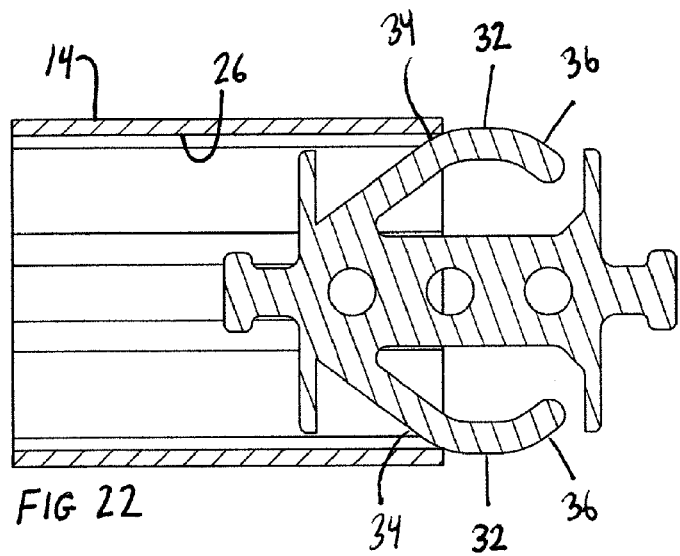
Figures 23, 24:
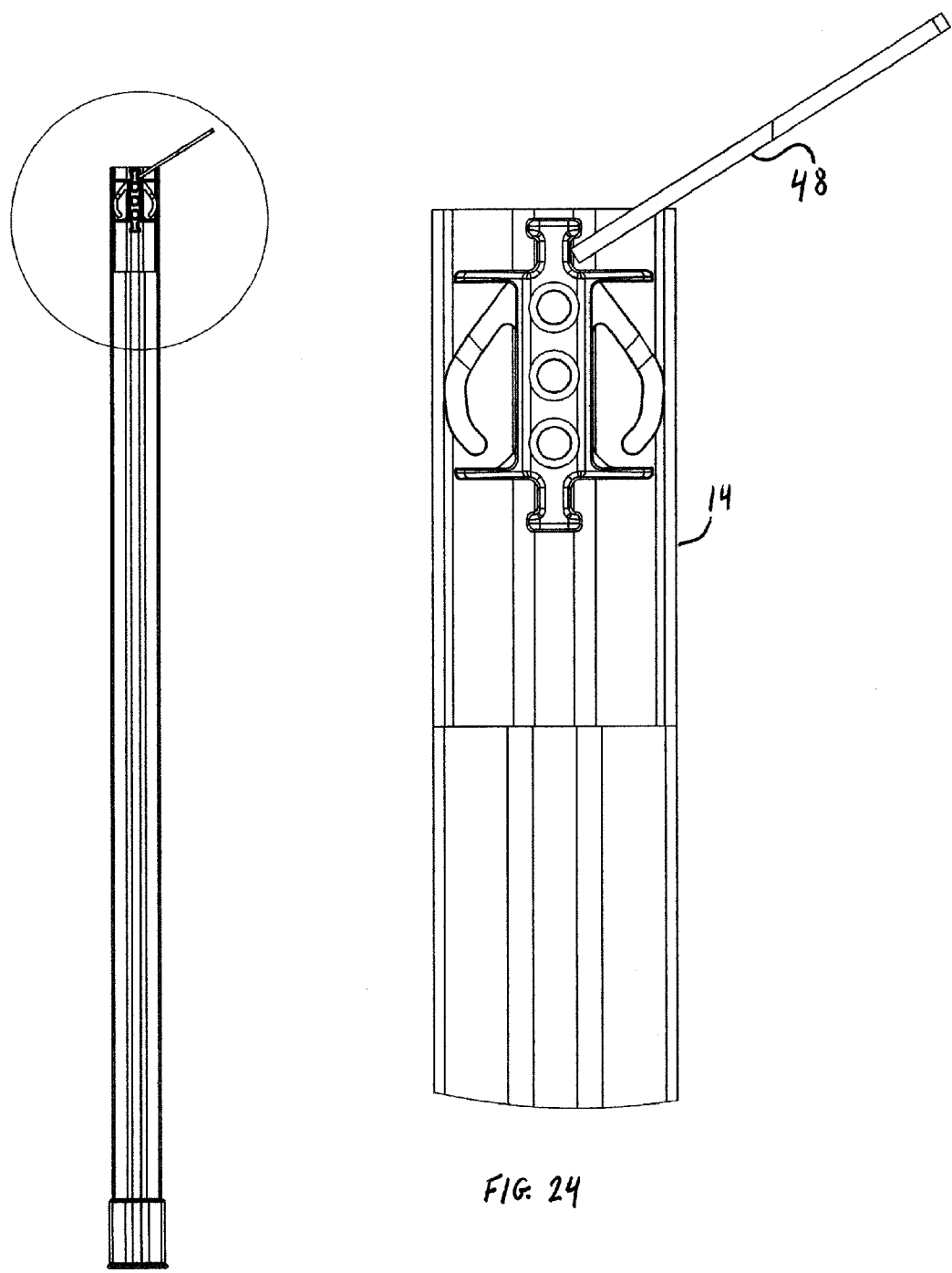
FIGS. 23 and 24 illustrates the removal of the connecting device from the pole by use of a flat slender tool.

Alternatively, connecting device 12 can also be assembled by inserting from the opposite direction with upper surface U again facing up (along the same orientation as hole 24). As seen in FIG. 22, connecting device 12 is inserted where the first leading surface 34 of arms 32 are in contact with the wall sections of pole 14. As detailed above, the user continues to insert connection device 12 causing arms 32 to resiliently flex inward to allow passage of connecting device 12. Again, if desired, the user can facilitate the inward movement of arms 32 by pinching them inward. Once connecting device 12 is fully inserted inside interior portion 26 of pole 14, the user can select the fastening receiving portion 22 and align to the hole 24 located on pole 14 for assembly of implement 16 as detailed above.

Figure 13:
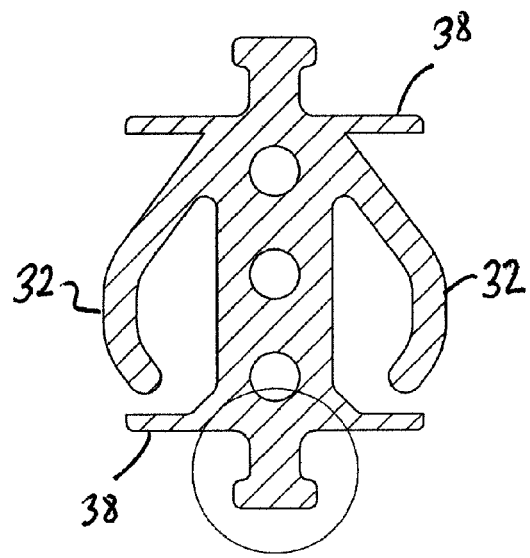
FIG. 13 is a cross-sectional view along line 46-46 taken from FIG. 12.
Figure 14:
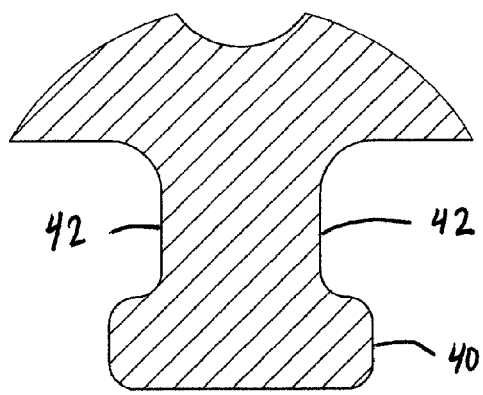
FIG. 14 is a detailed view taken from FIG. 13.
Figure 17:
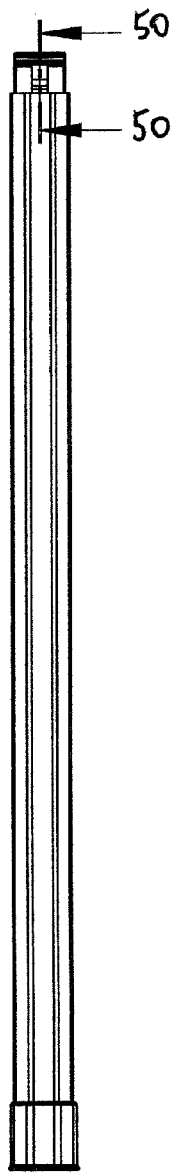
FIGS. 17 through 22 illustrate various assembly states of the connecting device to the pole.

In addition to the assembly from two directions (FIGS. 20&22) discussed above, there still yet exists two additional options. The symmetric configuration of connecting device 12 taken from section line 46-46 provides identical geometry as depicted in FIG. 13. Thus connecting device can be assembled via the two directions as detailed above with respect to FIGS. 18&22, but instead with the upper surface facing down (lower surface L being along the same orientation as hole 24).

Figures 19, 20:
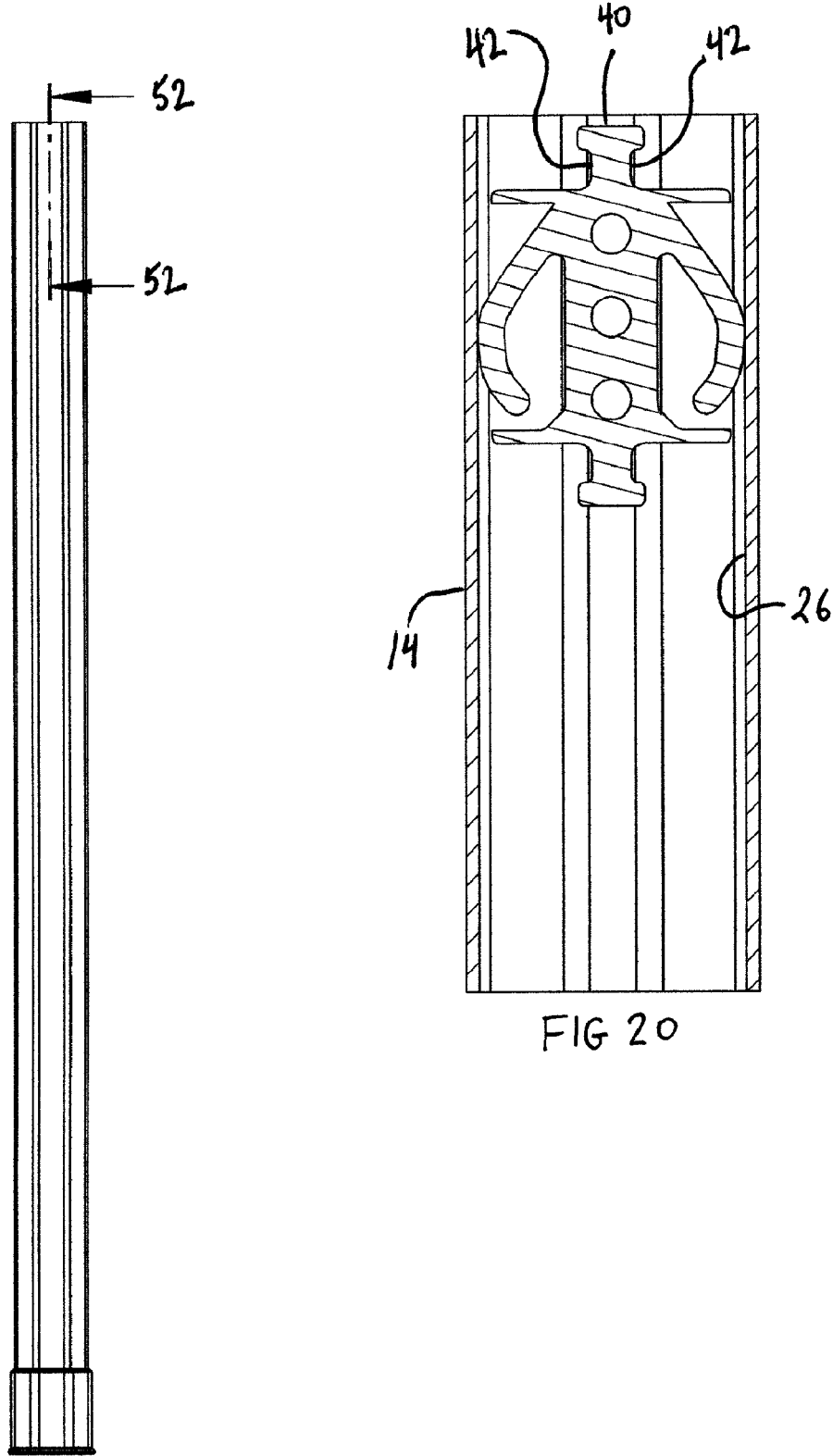
Figure 21:
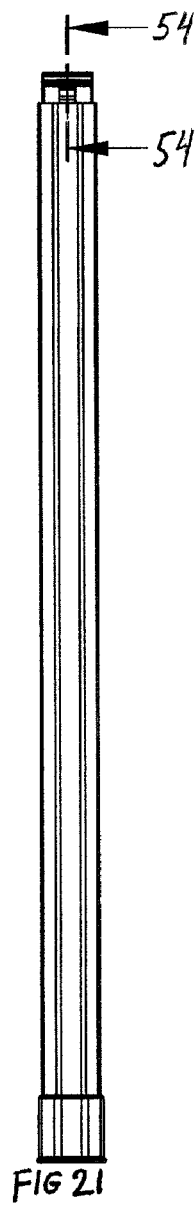

Removal of connecting device 12 is made possible by utilizing gripping portion 40. As best seen in FIG. 20, gripping portion has a pair of steps 42 which facilitates the removal of connecting device 12 from pole 14. In one situation, the user can simply grasp inside the steps 42 of gripping portion 40 and apply a pulling action for removal if the gripping portion 40 is accessible to the user. If desired, the user can facilitate the removal of connecting device using a gripping tool such as the commonly referred tool known as the needle nose pliers. Other gripping tools are also possible to facilitate removal if desired. If connecting device 12 is unable to be removed via grasping, it is possible to utilize a flat slender tool such as a screw driver. By reference to FIG. 24, the flat portion of the screwdriver 48 can be inserted inside step 42 and pried out by using the edge of pole 14 as a fulcrum. If a screwdriver is not available to some users, a simple kitchen utensil such as a butter knife can be substituted.

In the event that connecting device 12 is forced down to an inaccessible depth, there exist options for disassembly. First, the pole can be tapped onto a hard rigid surface utilizing a shock absorber. Such an arrangement is made possible by placing a cardboard section onto a concrete floor. The cardboard would protect the edges of pole 14. Depending on the rapid deceleration (i.e. instant stopping from impact) of the pole 14, the impact would cause connecting device 12 to overcome the retention force of the resilient arms 32 causing movement towards the opening of pole 14. This of course depends on several factors including and not limited to the stiffness and the amount of movement (deflection) of the arms 32, the velocity of the impact, the coefficient of friction between the interior portion 26 of the pole 14 and the arms 32, among others. Once connecting device 12 is moved forward and is accessible, it can be removed in the manors described above.

If impact removal or gripping removal is not desired, the user can simply insert a long slender object inside a first end of pole 14 and push out connecting device 12 out the second end of pole 14.

When connecting device 12 is configured to have a plurality of fastening receiving portions 22, prolonged life of connecting device 12 is possible. In the event that one or more fastening receiving portions become worn or damaged, the user can select others by simply moving connecting device to a new location and/or switching from the upper side U to the lower side L or vice versa. Thus, by utilizing three fastening receiving portions 22, the user has up to six options for tightening. Of course, multiple uses of a single fastening receiving portion 22 are also possible.

Referring now to FIGS. 25 and 26, a second device assembly according to exemplary embodiments of the present disclosure is shown having reference numeral 100. Device assembly 100 includes a connecting device 112, a pole 14, an implement 116, and a fastener 18. In this example, connecting device 112 is formed on implement 116 so that fastening receiving portion 122 is integral to implement 116. Thus fastening receiving portion 122 can be fabricated to be pre-aligned to hole 128 located on implement 116. This provides automatic alignment of hole 128 to hole 24 and fastening receiving portion 122 when implement 116 is installed onto pole 14.

Figure 26A:
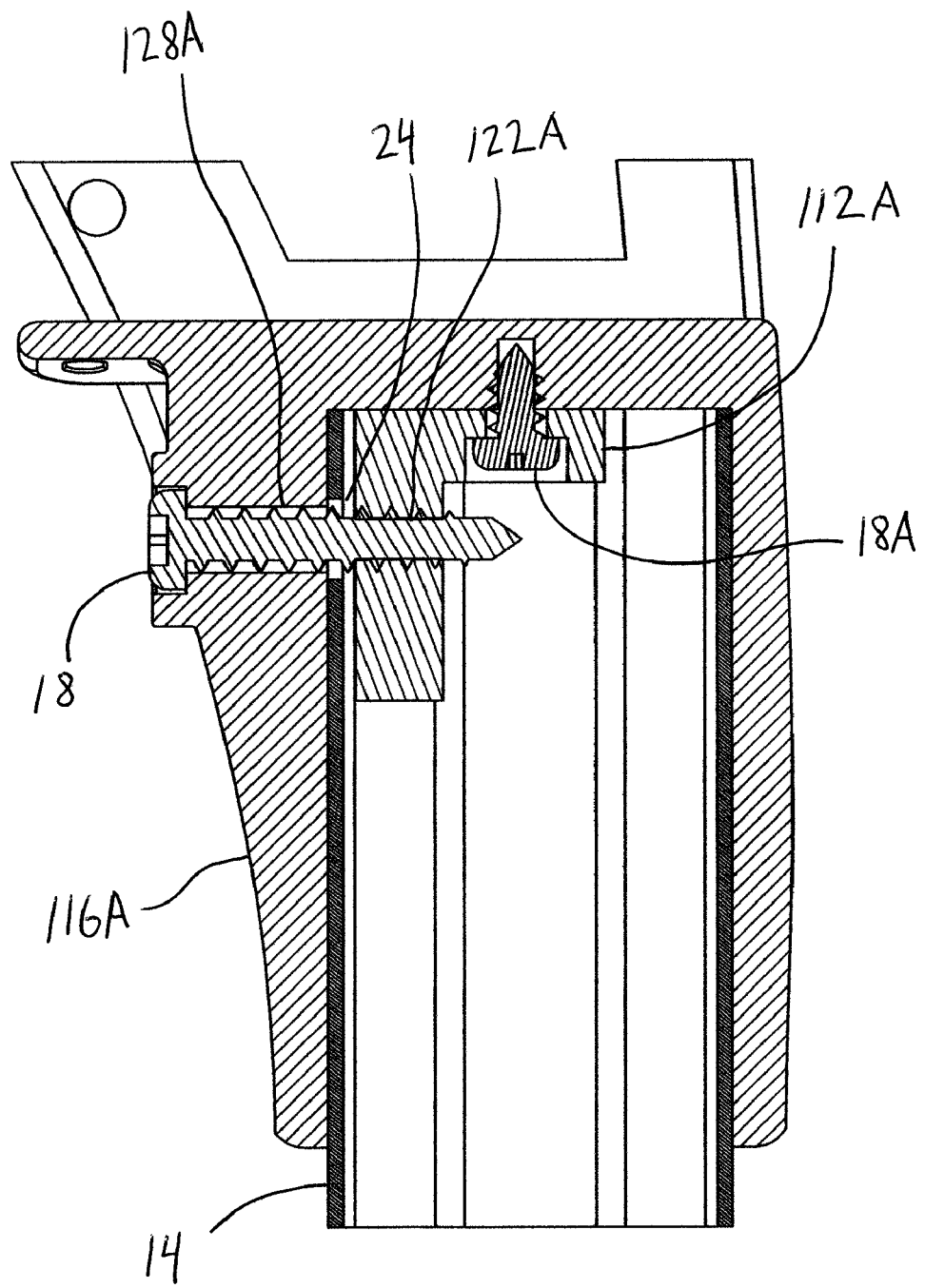

In this example, connecting device 112 can be formed into implement 116 in a permanent manor. In another example, if desired, fastening device 112 can be configured to be removable from implement 116. Thus, if made removable as shown in FIG. 26A, the user can replace connecting device 112 after fastening receiving portion is worn. In addition, if configured to be removable, connecting device 112 can be fabricated in any desired material and can have any desirable configuration for fastening receiving portion 122.

It should be noted that connecting device 112 is shown by example and those having ordinary skill in the art can appreciate the numerous options that fall under the scope of integrating connecting device 112 to implement 116.

Referring now to FIGS. 27 and 28, a third device assembly according to exemplary embodiments of the present disclosure is shown having reference numeral 200. Device assembly 200 includes a connecting device 212, a pole 14, an implement 16, and a fastener 18. In this example, connecting device 212 is formed within pole 14 so that fastening receiving portion 222 is integral to pole 14. Thus fastening receiving portion 222 can be fabricated to be pre-aligned to hole 24 located on pole 14. In one example, connecting device 212 can be permanently connected to pole 14. In this example, connecting device 212 can be cast directly into pole 14. This is achieved by placing a stopping surface along the desired depth of pole 14 and pouring a thermoset material inside the pole against the stopping surface when pole 14 is held vertical. As shown in FIG. 28, the stopping surface is inserted to a depth that forms a thickness defined by depth 60. Such a stopping surface can be a rubber stop inserted from the opposite end of pole 14 and removed later. In another example, stopping surface can be a thickness of wax inserted into the inner portion of pole 14 and can remain after casting. Such materials include and are not limited to cast urethane, silicone, etc.

Once the material is cured (i.e. hardened), fastening receiving portion 222 and hole 24 can be drilled as illustrated in FIG. 28. Those having ordinary skill in the art can appreciate that fastening receiving portion 222 can be formed using a pin prior to the pouring of the thermosetting material. Once cured, the pin can be extracted forming fastening receiving portion 222.

In this example, connecting device 212 can alternately be molded into pole 14 using an injection molding process to form a permanent assembly.

If desired, connecting device 212 can be removable by utilizing a resilient material such as hard rubber. Those having ordinary skill in the art can appreciate that various resilient materials can allow for connecting device 212 to be inserted and selectively moved to the desired position. Thus, if removable, the user can replace connecting device 212 after fastening receiving portion is worn.

In addition, if configured to be removable, connecting device 212 can be fabricated in any desired material and can have any desirable configuration for fastening receiving portion 222.

It should be noted that connecting device 212 is shown by example and those having ordinary skill in the art can appreciate the numerous options that fall under the scope of integrating connecting device 212 to pole 14.

As shown in FIG. 28, connecting device 212 contains a single fastening receiving portion 222. However, if connecting device 212 is designed to be movable with respect to pole 14 (i.e. a replaceable version), a plurality of fastening receiving portions 222 is possible. This would allow for the selection of alternate fastening receiving portions is one or more become worn and/or damaged.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. In addition combinations of the different features can be combined to create different products. Therefore, it is intended that the present disclosure not be limited to the particular embodiment(s) disclosed as the best mode contemplated, but that the disclosure will include all embodiments falling within the scope of the present disclosure.

What is claimed is:

1. A connecting device for securing an implement to a pole, comprising:
   body, having a first and a second side and a first and a second end, insertable into an inside portion of a pole, said body comprising:
   a pair of resilient arms, each arm having first and second sloped leading surfaces facing the directions of said first and second ends, respectively, to facilitate insertion of the first and second ends of said body into the pole, and
   a plurality of through-holes therein extending from said first side to said second side, said plurality of through-holes being in coaxial alignment and forming a plane normal to the coaxial alignment of said through-holes, said plane forming a line of symmetry to said body;
   a gripping portion extending from each of said first and second ends of said body configured to facilitate the insertion of said connecting device to the pole, said gripping portions including a pair of outwardly extending steps;
   wherein said pair of resilient arms provides a spring force along an inside portion of the pole to maintain said connecting device in a selected position after said connecting device is inserted inside the pole along said first side of said body, the selected position forming an alignment of a hole in the pole to one of said plurality of through-holes of said body for receiving a fastener;
   wherein upon use of a first of said plurality of through-holes by a fastener, said connecting device can be repositioned by use of said gripping portion to align to an alternate of said plurality of through-holes on the first side to extend the life of said connecting device after the first through-hole has been worn by the fastener, said gripping portion further allowing for the removal, reorientation and reinsertion of said connecting device to allow for an additional alternate of said plurality of through-holes along said second side of said body to a hole in the pole to further extend the life of said connecting device.

2. The connecting device of claim 1, wherein the implement is secured to the pole by use of a sheet metal screw secured to one of said plurality of through-holes.

3. The connecting device of claim 1, wherein the fastener is a thread forming screw.

4. The connecting device of claim 1, wherein the implement is a lacrosse head.

5. The connecting device of claim 1, wherein said connecting device further comprises one or more webs complimentary in shape to the inside portion of the pole.

6. The connecting device of claim 1, wherein said connecting device is configured to be insertable into the inside portion of the pole from a plurality of orientations.

7. The connecting device of claim 1, wherein said connecting device is fabricated of plastic.

8. A connecting device securing an implement to a hollow pole, comprising:
   a body having a first and a second side and a first and second end having a general shape complimentary to an inside portion of the hollow pole and being entirely inserted in a plurality of orientations into the inside portion of the pole, said body comprising a plurality of fastening receiving portions therein extending from said first side to said second side and configured to remain in a selected position when inserted inside the pole;
   a gripping portion extending from each end of said body, said gripping portion configured to facilitate the insertion of said connecting device to the pole, said gripping portions including a pair of outwardly extending steps;
   wherein said connecting device is maintained in the selected position to allow a user to assemble the implement to an outer portion of the pole with a fastener by maintaining alignment of a chosen one of said plurality of fastening receiving portions along the first side of said body to a hole in the pole for receiving the fastener;
   wherein upon use of said chosen fastening receiving portion by the fastener, said connecting device can be repositioned by use of said gripping portion to align to an alternate fastening receiving portion of said plurality of fastening receiving portions to extend the life of said connecting device after said chosen fastening receiving portion has been worn by the fastener, said gripping portion allowing for the removal for reinsertion of said connecting device to allow for an additional alternate of said plurality of fastening receiving portion along said second side of the connecting device to the hole in the pole to further extend the life of said connecting device.

9. The connecting device of claim 8, wherein said connecting device is maintained in the selected position by one or more resilient arms integrated on said body.

10. The connecting device of claim 8, wherein the implement is secured to the pole by use of a thread-forming screw secured to one of said one or more fastening receiving portions.

11. The connecting device of claim 8, wherein the implement is a lacrosse head.

* * * * *